US008516165B2

(12) United States Patent
Tsu (10) Patent No.: US 8,516,165 B2
(45) Date of Patent: Aug. 20, 2013

(54) SYSTEM AND METHOD FOR ENCODING PACKET HEADER TO ENABLE HIGHER BANDWIDTH EFFICIENCY ACROSS BUS LINKS (75) Inventor: William P. Tsu, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1698 days.

(21) Appl. No.: 11/253,870

(22) Filed: Oct. 19, 2005

(65) Prior Publication Data

US 2007/0130397 A1 Jun. 7, 2007

(51) Int. Cl.
*G06F 3/00* (2006.01)
(52) U.S. Cl.
USPC .......................................................... 710/30
(58) Field of Classification Search
USPC .......................................................... 710/30
See application file for complete search history.

(56) References Cited

U.S. PATENT DOCUMENTS

| | | | | |
|---|---|---|---|---|
| 6,032,197 A | * | 2/2000 | Birdwell et al. | 709/247 |
| 6,778,554 B2 | * | 8/2004 | Thrysoe | 370/466 |
| 7,210,000 B2 | * | 4/2007 | Creta et al. | 710/316 |
| 2006/0230210 A1 | * | 10/2006 | Stanton | 710/301 |
| 2007/0088873 A1 | * | 4/2007 | Oshikiri et al. | 710/58 |

OTHER PUBLICATIONS

PCI Express Base Specification Rev. 1.1, Mar. 2005, PCI Express, pp. 27-33, 43-94 and 127-159.*
PCI Express Base Specification, Mar. 2005, PCI Express, pp. 1-508.*

* cited by examiner

*Primary Examiner* — Steven Snyder
*Assistant Examiner* — Juanito Borromeo
(74) *Attorney, Agent, or Firm* — Patterson & Sheridan, L.L.P.

(57) ABSTRACT

A computer system that employs Peripheral Component Interconnect Express (PCIe) links includes devices that generate a PCIe packet having a header portion that is smaller than the header portion for a conventional PCI packet. The devices may be an endpoint device, such as a graphics processor, and a chipset, such as a root-complex. The reduced size header improves the bus throughput efficiency of the computer system and reduces power requirements for the computer system.

16 Claims, 7 Drawing Sheets

SYSTEM AND METHOD FOR ENCODING PACKET HEADER TO ENABLE HIGHER BANDWIDTH EFFICIENCY ACROSS BUS LINKS

BACKGROUND OF THE INVENTION

1. Field of the Invention

The invention generally relates to communication in computer systems. More specifically the invention relates to a method and system for communication in a computer system that employs Peripheral Component Interconnect Express (PCIe) links.

2. Description of the Related Art

The Peripheral Component Interconnect Express (PCIe) is a general purpose Input/Output (I/O) interconnect used for communication between two or more devices inside a computer. The examples of the devices may include a graphics processor and a chipset. A computer system that employs PCIe communicates by sending packets. The packets are formed in three discrete logical layers that include the transaction layer, the data link layer and the physical layer. Each packet has a header corresponding to these layers and a data payload portion. The header contains information that may include format, type, and attribute of a packet, address/routing information, encoding information, and data protection. The data payload portion contains data required by a device.

In conventional systems, a read completion packet is generated by a chipset that comprises a root-complex, upon completion of a memory read request issued by an endpoint device. The read completion packet includes a conventional read completion header portion and a data payload portion. The conventional read completion header portion includes a physical layer header that is two bytes long, a data link layer header that is six bytes long and a transaction layer header that is twelve bytes long.

Additionally, in conventional systems, a memory write request packet is generated by the endpoint device when issuing a memory write request to the root-complex. The memory write request packet includes a conventional memory write request header portion and a data payload portion. The conventional memory write request header portion includes a physical layer header that is two bytes long, a data link layer header that is six bytes long and a transaction layer header that is twelve bytes long.

These packets consume a large amount of bus bandwidth of computer systems employing PCIe links and limit the bus throughput efficiency of such systems. There is therefore, a need for a method and system that can increase the bus throughput efficiency of computer systems employing PCIe links.

SUMMARY OF THE INVENTION

An aspect of the invention is to provide a method and system for improving the bus throughput efficiency of computer systems employing PCIe links.

In order to achieve the above aspect, methods and systems for communication in a computer system that employs Peripheral Component Interconnect Express (PCIe) links are provided.

In an embodiment of the invention, a method of processing a memory read request is provided. The method includes receiving the memory read request over the PCIe link and reading data from a memory location in accordance with the memory read request. The method further includes generating a read completion packet including a header portion and a data payload portion, wherein the header portion is less than 20 bytes long. The read completion packet is then transmitted over the PCIe link.

In another embodiment of the invention, a method of issuing a memory write request over the PCIe link is provided. The method includes generating a memory write request packet including a header portion and a data payload portion. The header portion is less than 20 bytes long. The memory write request is then transmitted over the PCIe link.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION

Various embodiments of the invention provide methods and systems for communication in a computer system that employs Peripheral Component Interconnect Express (PCIe) links. The PCIe is a general purpose Input/Output (I/O) interconnect used for communication between two or more devices inside a computer. The devices may include one or more endpoint devices and a chipset.

Figure 1:
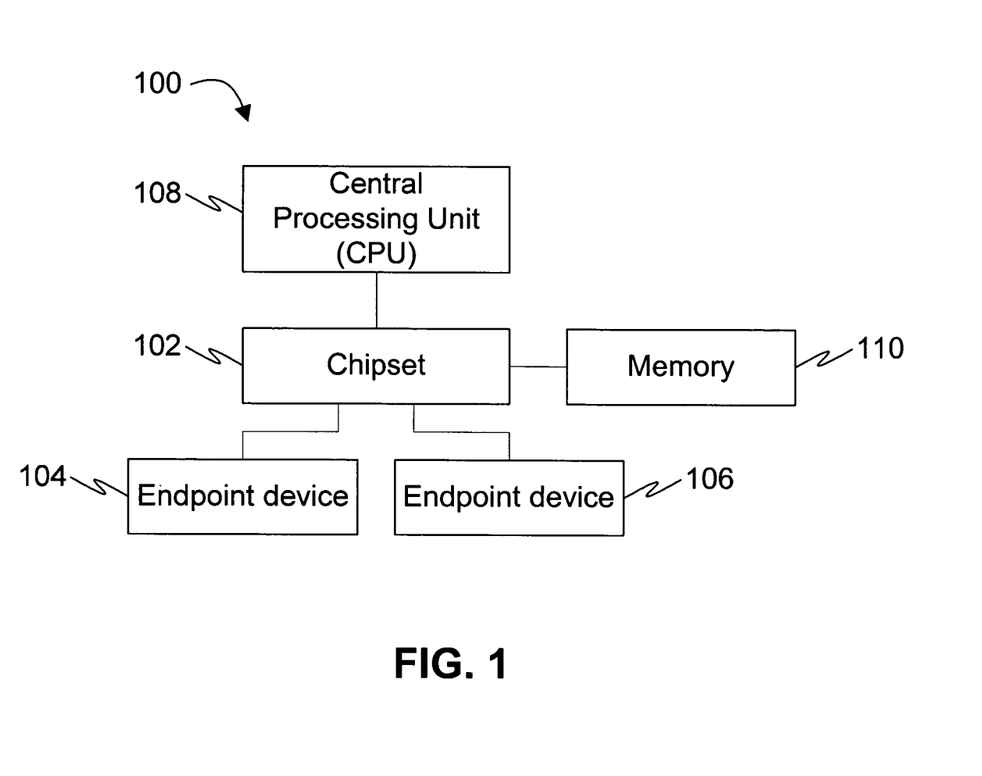
FIG. 1 is a block diagram showing an environment (that is exemplary), in which various embodiments of the invention can function.

FIG. 1 is a block diagram showing an environment 100 (that is exemplary), e.g., a computer system, in which various embodiments of the invention can function. Environment 100 includes a chipset 102, an endpoint device 104 and an endpoint device 106. It will be apparent to a person skilled in the art that the number of endpoint devices does not limit the invention in any way.

Chipset 102 is a root-complex, e.g., a chipset comprising chips that are commonly known as northbridge and southbridge that communicates with at least one of endpoint device 104 and endpoint device 106, a Central Processing Unit (CPU) 108 and a memory 110 for storing information that may be required by the different units. Chipset 102 is connected to endpoint device 104 and endpoint device 106 through PCIe links. Each of chipset 102, endpoint device 104 and endpoint device 106 is provided with a specially configured PCIe interface through which the PCIe link connection is made. Chipset 102 may also communicate with endpoint device 104 and endpoint device 106 through a switch that is connected to each of chipset 102, endpoint device 104 and endpoint device 106 by PCIe links.

Endpoint device 104 and endpoint device 106 may comprise I/O devices. Examples of these endpoint devices may include, but are not limited to, a graphics processor, an ethernet card, and a sound card. The communication is carried out by sending a plurality of PCIe packets on PCIe links that connect the endpoint devices 104, 106 to chipset 102.

A PCIe packet is generally formed in discrete logical layers such as a transaction layer, a data link layer and a physical layer. Each PCIe packet contains a header corresponding to one or more of these discrete logical layers, i.e., a Transaction Layer Header (TLH), a Data Link Layer Header (DLLH), and a Physical Layer Header (PLH). The data contained in these headers include, but are not limited to, format, type, attribute of a PCIe packet, address/routing information, encoding information, data protection and length of data payload. In addition to these headers, each PCIe packet includes a data payload. The data payload contains the data that is to be used by a logical device that receives the PCIe packet. Methods for generating a PCIe packet for communication in a PCIe system in accordance with various embodiments of the invention are explained hereinafter.

Figure 2:
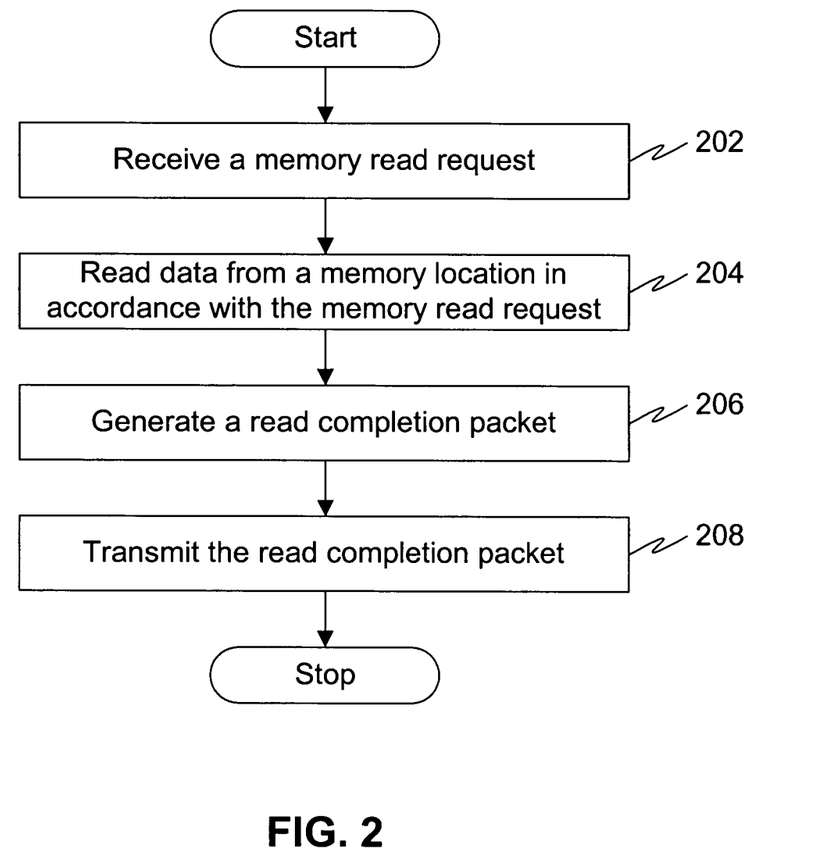
FIG. 2 is a flowchart of method steps for processing a memory read request in a computer system.

FIG. 2 is a flowchart of method steps for processing a memory read request in a computer system, in accordance with an embodiment of the invention. The computer system comprises a first device and a second device that are coupled to each other by a PCIe link. The first device may be one of endpoint devices 104, 106 and the second device may be chipset 102. The first device issues the memory read request. In an embodiment of the invention, the first device stores at least one requisite parameter in a tracking table indexed by a memory-read tag. The method of storing at least one requisite parameter is explained in conjunction with FIG. 3.

The memory read request is received by the second device at step 202. At step 204, data is read by the second device from a memory location in accordance with the memory read request. Examples of the memory location may include, but are not limited to, Random Access Memory (RAM), Read Only Memory (ROM), and Dynamic Random Access Memory (DRAM). At step 206, a read completion packet is generated upon completion of the memory read request. Thereafter, at step 208, the read completion packet is transmitted over the PCIe link to the first device.

The read completion packet includes a data payload portion and a header portion. The data payload portion includes information that is requested by the first device in the memory read request. The header portion is less than 20 bytes long. In an exemplary embodiment of the invention, the header portion includes a PLH that is two bytes long and a DLLH that is six bytes long. As a result, in this exemplary embodiment of the invention, the header portion of the read completion packet is eight bytes long.

In an embodiment of the invention, on the header portion of the read completion packet, a Transaction Layer Packet (TLP) sequence number and a completion tag are transmitted. The TLP sequence number is the identification number for a PCIe packet. The completion tag references a tracking table that contains the at least one requisite parameter associated with the memory read request.

Figure 3:
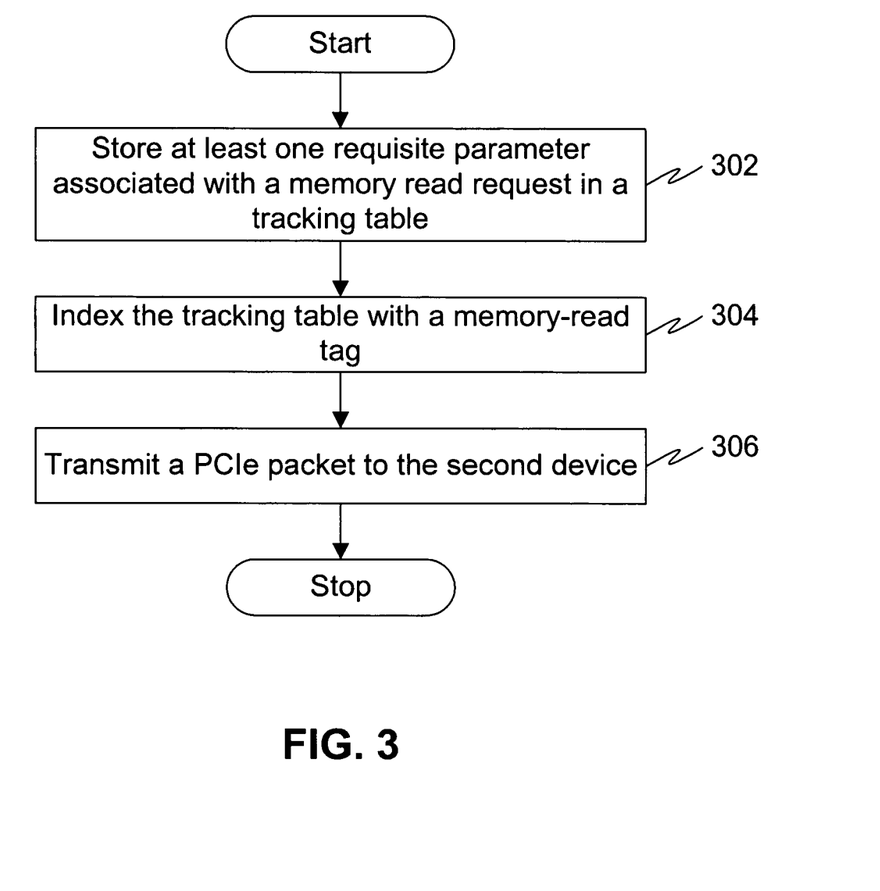
FIG. 3 is a flowchart of method steps for issuing the memory read request, in accordance with an embodiment of the invention.

FIG. 3 is a flowchart of method steps for issuing the memory read request, in accordance with an embodiment of the invention. At step 302, the first device stores at least one requisite parameter associated with the memory read request in a tracking table. Examples of the at least one requisite parameter may include, a Traffic Class (TC) field, a Relaxed Ordering (RO) field, a No Snoop (NS) field, a byte count field, and a lower address field. The TC field classifies a PCI transaction sequence into different classes. Each class associates a PCI transaction sequence with the type of service required by it. The RO field and the NO field are attributes that help in handling traffic on a PCIe link. The values in these fields must remain the same as a memory read request is carried out and a read completion is reported. The byte count field conveys the numbers of data bytes that are present in a packet. The lower address field is the lowest seven bits of the read address. The complete read address is specified in the header portion of a memory read request packet. At step 304, the tracking table is indexed with a memory-read tag that is transmitted with the memory read request issued by the first device. The memory-read tag is an eight-bit number. In the embodiment of the present invention illustrated herein, the memory-read tag has a value that is less than 16. At step 306, a PCIe packet is then transmitted to the second device by the first device to issue the memory read request.

Figure 4A:
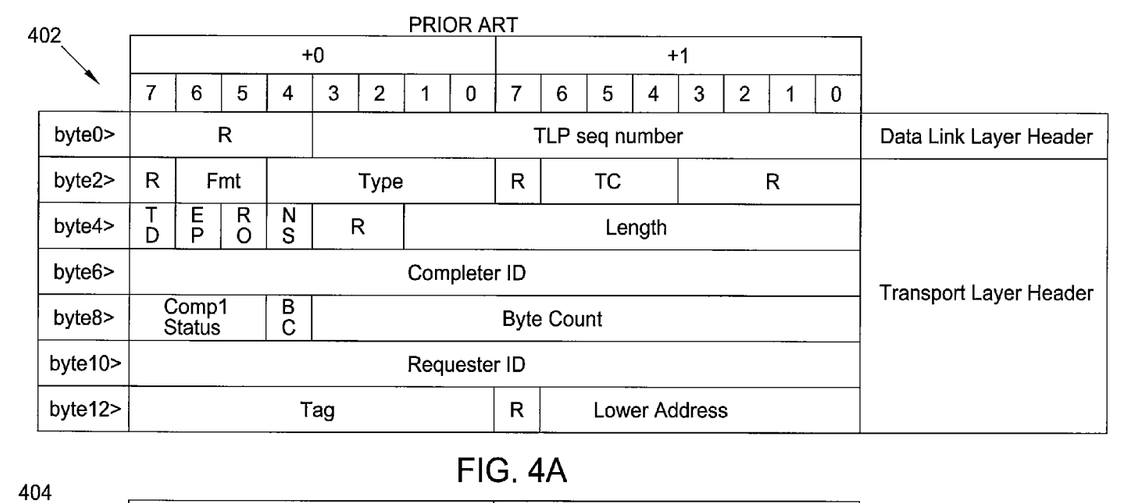
FIG. 4A shows a header portion of a prior art read completion packet.

FIG. 4A shows a header portion 402 of a prior art read completion packet. Header portion 402 includes a PLH (not shown in FIG. 4A) that is two bytes long, a DLLH that is six bytes long, including the two bytes shown in FIG. 4A and four bytes of Link Cyclic Redundancy Check (LCRC) code not shown in FIG. 4A, and a TLH that is twelve bytes long. The DLLH of header portion 402 includes a zeroeth byte and a first byte. The TLH of header portion 402 includes bytes from a second byte to a 13th byte. A TLP sequence number is transmitted on the first four bits of the zeroeth byte of header portion 402 concatenated with eight bits of the first byte. The last four bits of the zeroeth byte are transmitted as reserved bits. Further, a first set of parameters is transmitted on the TLH of header portion 402. The first set of parameters include a format field, a type field, a memory-tag field, a TC field, a Transaction Description (TD) field, an Endpoint (EP) field, an RO field, an NS field, a completer ID, a requester ID, a completion status, a lower address field, a length field, a BC field, and a byte count field.

The format field describes the format of a request. The type field describes the type of a request. Further, the memory-tag field of header portion 402 is eight bits long. The TD field describes the properties of a PCIe transaction sequence. The EP field is used for error forwarding. The length field contains a value corresponding to the total number of bytes that have been read in response to the read request. The completer ID is a combination of a completer's bus number, device number, and function number used to uniquely identify the completer. The requester ID is a combination of a requester's bus number, device number, and function number that uniquely identifies the requester. The completion status indicates whether or not the requested read was successful. The BC field is typically zero.

In addition to the first set of parameters, a plurality of bits of the TLH of header portion 402 is transmitted as reserved bits. For example, the seventh bit of the second byte, the zeroeth bit to the third bit of the third byte and the seventh bit of the third byte, the second bit and the third bit of the fourth byte, and the seventh bit of the 13th byte of the TLH of header portion 402 are transmitted as reserved bits.

Figure 4B:
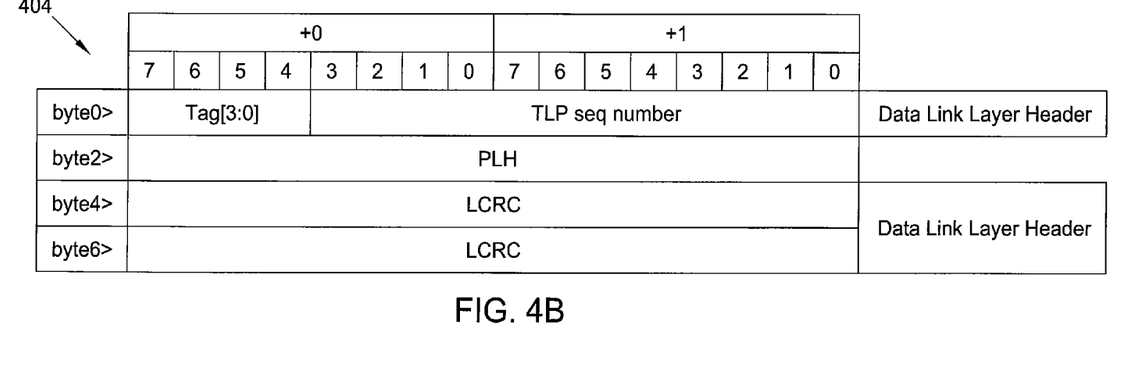
FIG. 4B shows a header portion of a read completion packet that is generated in accordance with an exemplary embodiment of the invention.

FIG. 4B shows a header portion 404 of a read completion packet that is generated in accordance with an exemplary embodiment of the invention. Header portion 404 includes a PLH that is two bytes long and a DLLH that is six bytes long, including the two bytes that are shown in FIG. 4B and four bytes of LCRC code not shown in FIG. 4B. The TLP sequence number and a completion tag are transmitted on the DLLH of header portion 404. The TLP sequence number is transmitted on the eight bits of the first byte concatenated with the first four bits of the zeroeth byte of the DLLH of header portion 404. The completion tag is four bits long and is transmitted on the last four bits of the zeroeth byte of the DLLH of header portion 404. The completion tag includes the four least significant bits of the memory-read tag that is transmitted with the memory read request. In the embodiment of the present invention illustrated herein, the four most significant bits of the memory-read tag are assumed to be zero and are not included in the header portion 404.

The first device receives the read completion packet with header portion 404 and extracts the header information in the following manner. First, the format and type of read completion packet are not included in header portion 404 but read completion packets are of only one type, namely read completion, and so the PCIe interface of the first device assumes the received PCIe packet to be of the read completion type. There are other header information that are assumed to have certain values and therefore are not included in header portion 404. They include: the TD field, which is assumed to be zero; the EP field, which is assumed to be zero; the completion status, which is assumed to be successful; the BC field, which is assumed to be zero; and the four most significant bits of the memory-tag field, which are assumed to be zero. Further, the completer ID and the requester ID are not used and so these fields are not included in header portion 404. The length field is not included in header portion 404 because the packet length is calculated from the received packet. The remaining header information, including the TC field, RO field, NS field, the byte count field, and the lower address field are recovered from the tracking table using the completion tag.

Figure 5:
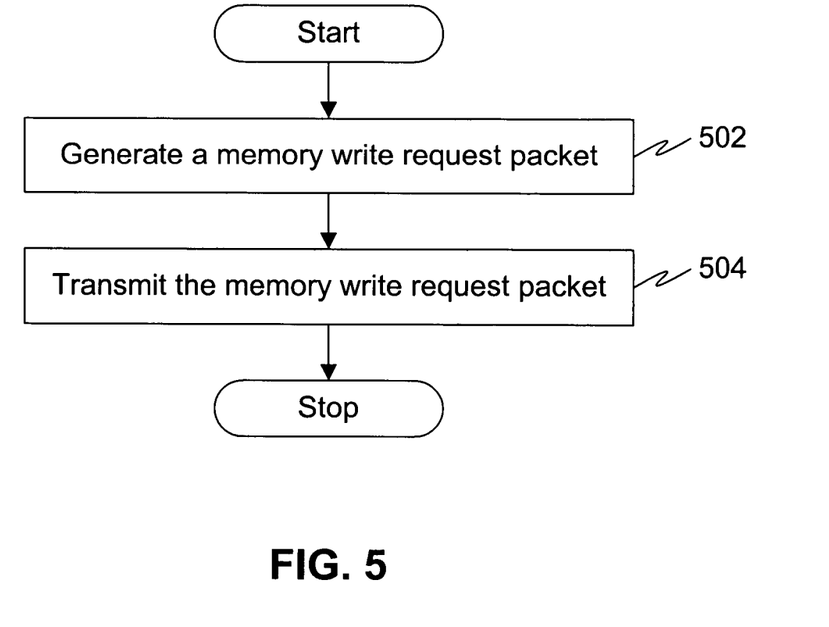
FIG. 5 is a flowchart of method steps for issuing a memory write request in a computer system.

FIG. 5 is a flowchart of method steps for issuing a memory write request in a computer system, in accordance with an embodiment of the invention. The computer system includes a first device and a second device that are coupled to each other by a PCIe link. The first device may be one of endpoint devices 104, 106 and the second device may be chipset 102. The memory write request is issued by the first device. At step 502, a memory write request packet is generated. The memory write request packet includes a data payload portion and a header portion that is less than 20 bytes. The data payload portion contains information that is required by the second device for processing the memory write request. In an exemplary embodiment of the invention, the header portion includes a PLH that is two bytes long, a DLLH that is six bytes long, and a TLH that is four bytes long. As a result, in this exemplary embodiment, the header portion is 12 bytes long.

Further, at step 504, the memory write request packet is transmitted over the PCIe link to the second device. A TLP sequence number and a predetermined set of parameters are transmitted on the header portion of the memory write request packet.

The predetermined set of parameters includes one or more of a format indicator, a size indicator, a TC field, a RO field, and an NS field. Further, the predetermined set of parameters includes a memory write address.

Figure 6A:
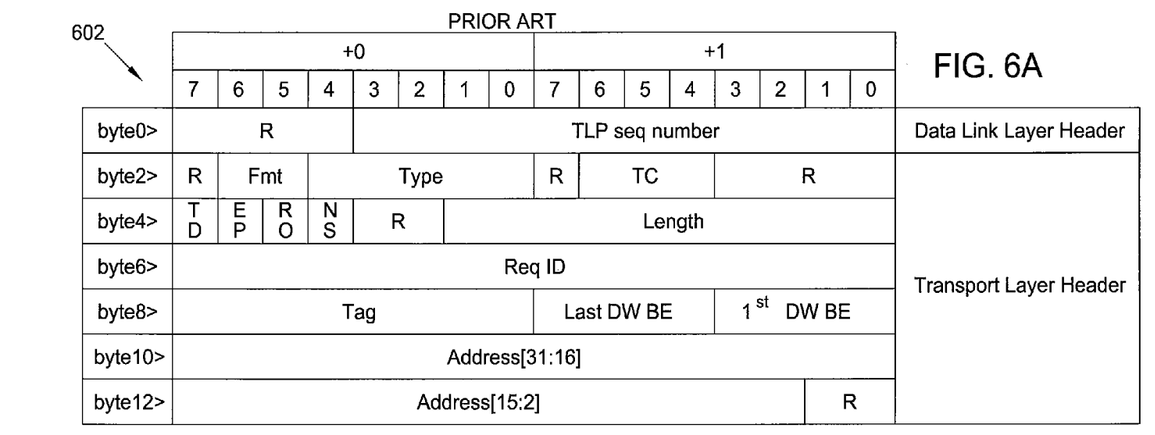
FIG. 6A shows a header portion of a prior art memory write request packet.

FIG. 6A shows a header portion 602 of a prior art memory write request packet. Header portion 602 includes a PLH (not shown in FIG. 6A) that is two bytes long, a DLLH that is six bytes long, including two bytes that are shown in FIG. 6A and four bytes of LCRC code not shown in FIG. 6A, and a TLH that is twelve bytes long. The DLLH of header portion 602 includes a zeroeth byte and a first byte and the TLH of header portion 602 includes bytes from a second byte to a 13th byte. A TLP sequence number is transmitted on the eight bits of the first byte concatenated with first four bits of the zeroeth byte. The last four bits of the zeroeth byte are transmitted as reserved bits. Other parameters include a format field, a type field, a memory-write tag field, a 3-bit TC field, a TD field, an EP field, an RO field, an NS field, a length field, a requester ID field, last Double Word Byte Enable (Last DW BE) field and a 1st DW BE field. The last DW BE field contains byte enables for a last DW of a service request. The 1st DW BE field contains byte enables for a first DW of a service request. Further, address bits are transmitted on the tenth byte, eleventh byte, twelfth byte and the last six bits of the thirteenth byte. The seventh bit of second byte, the zeroeth bit to third bit of third byte and the seventh bit of the third byte, second and third bit of the fourth byte, and the zeroeth bit and the first bit of the 13th byte are transmitted as reserved bits.

Figure 6B:
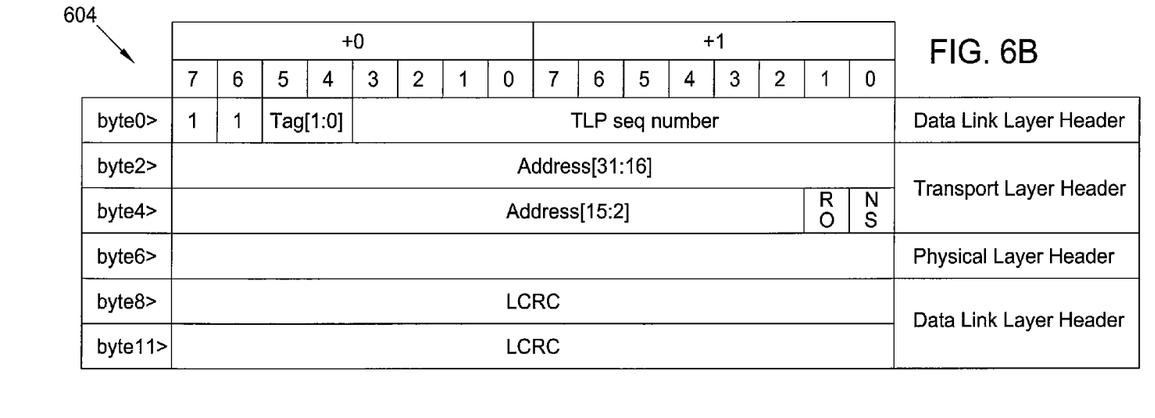
FIG. 6B shows a header portion of a memory write request packet that is generated in accordance with an exemplary embodiment of the invention.

FIG. 6B shows a header portion 604 of a memory write request packet that is generated in accordance with an exemplary embodiment of the invention. Header portion 604 includes a PLH that is two bytes long, a DLLH that is six bytes long, including two bytes that are shown in FIG. 6B and four bytes of LCRC code not shown in FIG. 6B, and a TLH that is four bytes long. The DLLH includes a zeroeth byte and a first byte. The TLH includes a second byte, a third byte, a fourth byte and a fifth byte.

The TLP sequence number and the predetermined set of parameters are transmitted on header portion 604. The TLP sequence number is transmitted on the first byte concatenated with four bits of the zeroeth byte. The predetermined set of parameters includes the format indicator, the size indicator, first bit and second bit of the TC field, the RO field and the NS field. The format indicator is transmitted on the seventh bit of the zeroeth byte of the DLLH and it contains a value of one that corresponds to the memory write request. The size indicator that is transmitted on the sixth bit of the zeroeth byte of the DLLH contains a value of one that corresponds to a size of 64 bits for the memory write request packet. A value of zero for the size indicator corresponds to a size of 32 bits for the memory write request packet. Further, the first bit and second bit of the TC field is transmitted on the fifth and fourth bit of the zeroeth byte. In addition to these parameters, address bits are transmitted on the second, third, and fourth byte concatenated with five bits of the fifth byte. Further, the RO field is transmitted on the first bit and the NS field is transmitted on the zeroeth bit of the fifth byte.

The second device receives the memory write request and extracts the header information in the following way. The format and type are encoded as 1 and 1 to indicate a 64-bit memory write request and as 1 and 0 to indicate a 32-bit memory write request. There is other header information that is assumed to have certain values and thus is not included in header portion 604. They include: the third bit of the TC field, which is assumed to be zero; the TD field, which is assumed to be zero; the EP field, which is assumed to be zero; and each of the last DW BE field and the 1st DW BE field, which are assumed to have a value of one. Further, the requester ID and the memory-write tag are not used and are not included in header portion 604.

Figure 7:
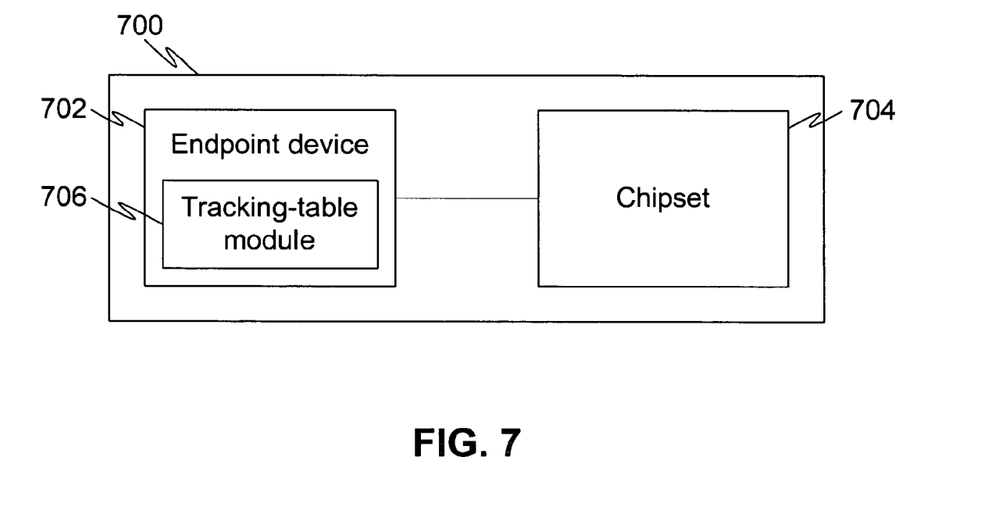
FIG. 7 is a block diagram showing a computer system, in accordance with an embodiment of the invention.

FIG. 7 is a block diagram showing a computer system 700, in accordance with an embodiment of the invention. Computer system 700 includes a device that has a PCIe interface programmed to generate a PCIe packet having a header portion that is less than 20 bytes. The device may be one of an endpoint device 702 and a chipset 704.

In an embodiment of the invention, the PCIe packet may be a memory write request packet generated by endpoint device 702 in connection with a memory read request. A predetermined set of parameters and a TLP sequence number are transmitted on the memory write request packet that is received by chipset 704. The predetermined set of parameters is then extracted by the PCIe interface of chipset 704. In another embodiment of the invention, the PCIe packet may be a read completion packet generated by chipset 704 when a memory read request issued by endpoint device 702 has completed. A completion tag and a TLP sequence number are transmitted on the read completion packet that is received by endpoint device 702. The header information is extracted by the PCIe interface of endpoint device 702.

Endpoint device 702 may include a tracking-table module 706 that stores at least one requisite parameter associated with a memory read request in a tracking table. The at least one requisite parameter is recovered by endpoint device 702 using the tracking table when it receives the read completion packet from chipset 704 in response to the memory read request.

Various embodiment of the invention provide a method and system for improving the bus throughput efficiency of a PCIe link. For example, for a completion packet with 32 bytes of payload, the bus throughput efficiency improves from 61% to 80%. Similarly, for the completion packet with 64 bytes of payload, the bus throughput efficiency improves from 76% to 89%. In another example, for a posted write packet with 32 bytes of payload, the bus throughput efficiency improves from 61% to 73%. Similarly, for the posted write packet with 64 bytes of payload, the bus throughput efficiency improves from 76% to 84%.

Further, a computer system implementing various aspects of the invention switches to a low power state quicker and stays in the low power state for a long time. This contributes to power savings, which is valuable in mobile applications.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. In a computer system having a first device and a second device coupled to each other by a bus link, a method of processing a memory read request by the second device, the method comprising the steps of:
   a. generating the memory read request including a completion tag by the first device, the completion tag indexing a tracking table that is stored in the first device;
   b. transmitting the memory read request over the bus link from the first device to the second device to issue the memory read request;
   c. receiving the memory read request issued by the first device over the bus link;
   d. reading data from a memory location in accordance with the memory read request;
   e. generating a read completion packet including a header portion including a Transaction Layer Packet sequence number and the completion tag, wherein the completion tag is used by the first device to recover a requisite parameter associated with the memory read request and the recovered requisite parameter is not transmitted in the read completion packet; and
   f. transmitting the read completion packet, included in a Data Link Layer Header (DLLH) together with at least four bytes of Link Cyclic Redundant Check (LCRC) code, over the bus link to the first device to allow the first device to recover the requisite parameter from the tracking table.

2. The method of claim 1, wherein the first device is an endpoint device and the second device is a chipset.

3. The method of claim 1, wherein the header portion does not include a transaction description (TD) field, an endpoint (EP) field, completion status, a byte count (BC) field and the 4 most significant bits of a memory tag fields, all of which are not transmitted to the first device and are assumed to be zero.

4. A computer system, comprising:
   a first endpoint device comprising a tracking-table module, the tracking-table module storing a plurality of requisite parameters associated with a memory read request in a tracking table, and configured to:
   generate the memory read request including a completion tag that indexes the tracking table;
   transmit the memory read request over the bus link from the first endpoint device to a second endpoint device to issue the memory read request;
   the bus link configured between the first endpoint device and the second endpoint device; and
   the second endpoint device that is configured to receive the memory read request over the bus link;
   read data from a memory location in accordance with the memory read request;
   generate a read completion packet having the header portion including a Transaction Layer Packet sequence number and the completion tag, wherein the completion tag is used by the first endpoint device to recover a requisite parameter associated with the memory read request and the recovered requisite parameter is not transmitted in the read completion packet; and
   transmit the read completion packet, included in a Data Link Layer Header (DLLH) together with at least four bytes of Link Cyclic Redundant Check (LCRC) code, over the bus link to the first endpoint device, the first endpoint device recovering the requisite parameter including a Tracking Class (TC) field, a Relaxed Ordering (RO) field, a No Snoop (NS) field, a byte count field, and a lower address field from the tracking table.

5. The computer system of claim 4, wherein the first endpoint device is a graphics processor.

6. The method of claim 1 wherein the Transaction Layer Packet (TLP) sequence number is transmitted on the first eight bits of the first byte concentrated with the first four bits of the zeroeth byte of the Data Link Layer Header of the header.

7. The method of claim 6 including transmitting the completion tag on the last 4 bits of the zeroeth byte of the Data Link Layer Header.

8. The method of claim 1 where a complete identification (ID) and request identification (ID) are not used and are not transmitted.

9. The method of claim 1 wherein the length field is not transmitted.

10. The method of claim 1, wherein a third bit of the Traffic Class (TC) field is assumed to be zero;
   a TD field is assumed to be all zeroes;
   an EP field is assumed to be all zeroes; and
   each of the last DW BE field and the first DW BE field are assumed to have a value of one, and none of the TD field, the TC field, the EP field and the last DW BE field and the first DW BE field are transmitted in the memory write request.

11. The method of claim 1, wherein the header portion is less than 20 bytes long.

12. The method of claim 1, further comprising the step of storing the requisite parameter associated with the memory read request in the tracking table.

13. The method of claim 1, wherein the recovered requisite parameter is one of a Tracking Class (TC) field, a Relaxed Ordering (RO) field, a No Snoop (NS) field, a byte count field, and a lower address field.

14. The method of claim 4, wherein the header portion is less than 20 bytes long.

15. The computer system of claim 4, wherein the first endpoint device is further configured to store the requisite parameter associated with the memory read request in the tracking table.

16. The computer system of claim 4, wherein the recovered requisite parameter is one of a Tracking Class (TC) field, a Relaxed Ordering (RO) field, a No Snoop (NS) field, a byte count field, and a lower address field.

* * * * *